US006795148B2

(12) United States Patent
Ozawa et al.

(10) Patent No.: US 6,795,148 B2
(45) Date of Patent: Sep. 21, 2004

(54) LIQUID CRYSTAL DISPLAY DEVICE AND ELECTRONIC APPARATUS HAVING COLOR FILTER LAYER COMPRISING CHOLESTERIC LIQUID CRYSTAL FILMS AND PIGMENTED FILMS

(75) Inventors: Kinya Ozawa, Suwa (JP); Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/278,929

(22) Filed: Oct. 24, 2002

(65) Prior Publication Data

US 2003/0076466 A1 Apr. 24, 2003

(30) Foreign Application Priority Data

Oct. 24, 2001 (JP) ........................................ 2001-326523
Nov. 28, 2001 (JP) ........................................ 2001-363330

(51) Int. Cl.[7] ............................................ G02F 1/1335
(52) U.S. Cl. ........................ 349/115; 349/113; 349/106
(58) Field of Search ................................. 349/113, 114, 349/115, 106

(56) References Cited

U.S. PATENT DOCUMENTS 6,621,543 B2 * 9/2003 Moon ......................... 349/115
2001/0030720 A1 * 10/2001 Ichihashi .................... 349/106
2002/0135719 A1 * 9/2002 Moon et al. ................ 349/115

FOREIGN PATENT DOCUMENTS

| JP | A-2000-258760 | 9/2000 | |
| JP | A-2000-275631 | 10/2000 | |
| JP | 2000347179 A | * 12/2000 | ......... G02F/1/1335 |
| JP | A-2000-352611 | 12/2000 | |
| JP | A 2001-183644 | 7/2001 | |

OTHER PUBLICATIONS

JP 2000-347179 A Detailed Description translation by computer.*

* cited by examiner

Primary Examiner—Dung T. Nguyen
Assistant Examiner—Michael H Caley
(74) Attorney, Agent, or Firm—Oliff & Berridge, PLC

(57) ABSTRACT

The invention provides a transflective liquid crystal display device in which the brightness in a transmissive mode is enhanced to have excellent visibility. A liquid crystal display device of the present invention has an upper substrate and a lower substrate opposing each other and liquid crystal held between the upper substrate and the lower substrate. A transflective layer including cholesteric liquid crystal films are disposed above the lower substrate. A backlight is also provided. Retardation layers and polarizers are disposed outside the upper substrate and the lower substrate, respectively, in that order from the substrate sides. A pigmented color filter layer including pigmented films underlies the transflective layer to transmit light of the same color as that of light selectively reflected at the respective cholesteric liquid crystal films.

18 Claims, 10 Drawing Sheets

LIQUID CRYSTAL DISPLAY DEVICE AND ELECTRONIC APPARATUS HAVING COLOR FILTER LAYER COMPRISING CHOLESTERIC LIQUID CRYSTAL FILMS AND PIGMENTED FILMS

BACKGROUND OF THE INVENTION

1. Field of Invention

The present invention relates to liquid crystal display devices and to electronic apparatuses. In particular, the invention relates to a structure of transflective liquid crystal display devices having excellent visibility, and which can display sufficiently bright images not only in a reflective display mode but also in a transmissive display mode.

2. Description of Related Art

Reflective liquid crystal display devices reduce power consumption because they do not have any light sources, such as a backlight. These devices have therefore been used for various portable electronic apparatuses or the like. However, since the reflective liquid crystal display devices use outside light, such as natural light or illumination light to display images, it is difficult to view the images in dark places. Accordingly, another type of liquid crystal display device has been proposed which uses outside light in bright places, as in the conventional reflective liquid crystal display devices, and uses an internal light source to make displayed images visible in dark places. Hence, this type of liquid crystal display device uses a display system serving as both a reflective display and a transmissive display. In this system, a reflective display mode or a transmissive display mode is selected according to the ambient brightness, thereby displaying clear images even in dark places while reducing power consumption. Hereinafter, this type of liquid crystal display device is referred to as a "transflective liquid crystal display device", in this application.

A transflective liquid crystal display device has been proposed which has a reflecting layer having slits (apertures) to transmit light and formed of a metal, such as aluminum on the inner surface of a lower substrate (hereinafter, the liquid crystal side surfaces of substrates is referred to as "inner surfaces", and the opposite surfaces are referred to as "outer surfaces") and which allows the reflecting layer to serve as a transflective layer. In this liquid crystal display device, by providing the metallic film on the inner surface of the lower substrate, the parallax effect due to the thickness of the lower substrate is reduced. In particular, color mixture is prevented in a structure having color filters.

FIG. 13 shows an example of a related art transflective liquid crystal display device using the transflective layer.

The liquid crystal display device 100 has liquid crystal 103 held between a pair of transparent substrates 101 and 102. A reflecting layer 104 and an insulating layer 106 are deposited on the lower substrate 101. A lower electrode 108 is formed of a transparent conductive film, such as an indium tin oxide (hereinafter referred to as ITO) film, on the insulating layer 106, and the lower electrode 108 is covered with an alignment layer 107. On the other hand, on the upper substrate 102, a color filter 109 including R (red), G (green), and B (blue) pigmented films are formed. A planarizing layer 111 is deposited on the color filter 109. Upper electrodes 112 are formed of a transparent conductive film, such as an ITO film, on the planarizing film 111, and the upper electrodes 112 are covered with an alignment layer 113.

The reflecting layer 104 is formed of a metal having a high optical reflectivity, such as aluminum, and the reflecting layer 104 has a slit 110 to transmit light in each pixel. The slits 110 allow the reflecting layer 104 to serve as a "transflective layer" (therefore, hereinafter, the reflecting layer 104 is referred to as a transflective layer). In addition, the upper substrate 102 is provided with a front diffuser 118, a retardation layer 119, and an upper polarizer 114 on the outer surface thereof, in that order from the upper substrate 102 side. The lower substrate 101 is provided with a quarter wave plate 115 and a lower polarizer 116 on the outer surface thereof, in that order. Also, a backlight 117 (illumination device) is disposed under the lower surface of the lower substrate 101, that is, under the lower polarizer 116.

When the liquid crystal display device 100 shown in FIG. 13 is used in a reflective mode in a bright place, outside light entering through the upper substrate 102 from above, such as sunlight or illumination light, passes through the liquid crystal 103 to be reflected at the surface of the transflective layer 104 on the lower substrate 101, and then passes through the liquid crystal 103 again to be emitted to the upper substrate 102 side. On the other hand, when the liquid crystal display device 100 is used in a transmissive mode in a dark place, light emitted from the backlight 117 under the lower substrate 101 passes through the slits 110 of the reflecting layer 104, and then passes through the liquid crystal 103 to be emitted to the upper substrate 102 side. This light contributes to displaying images in the respective modes.

In such a transflective liquid crystal display device, a metallic film having a high optical reflectivity, such as an aluminum or silver film, can be used as the reflecting layer. On the other hand, a dielectric mirror formed by alternately laminating dielectric thin layers having different refractive indexes, a cholesteric reflector using a cholesteric liquid crystal, a hologram reflector using a hologram element, can be used. These new types of reflectors not only serve as reflectors to reflect light, making use of the characteristics of the constituents thereof, but also have a particular function.

In particular, the cholesteric liquid crystal exhibits a liquid crystal phase at a specific temperature (liquid crystal transition temperature) or more, in which liquid crystal molecules are arranged in a regular helical manner with a constant pitch. This structure allows the cholesteric liquid crystal to selectively reflect only light having a wavelength corresponding to the pitch of the helix, and thus to transmit the other light. Since the pitch of the helix can be controlled by, for example, changing the ultraviolet light intensity or the temperature when the liquid crystal is hardened, the color of reflected light is locally changeable, and the cholesteric liquid crystal can therefore be used as a reflective color filter. Also, by laminating a plurality of cholesteric liquid crystal layers to selectively reflect light of different colors, the resulting laminate can serve as a reflector to reflect white light.

SUMMARY OF THE INVENTION

However, the related art transflective liquid crystal display device as shown in FIG. 13 has a problem in that, while displayed images can be viewed, regardless of the presence or absence of outside light, the brightness of images in a transmissive mode is degraded a lot in comparison with in a reflective mode. This is because, in the transmissive mode, no more than substantially half of light emitted from the backlight is used to display images, and only the light passing through the slits of the transflective layer contributes to displaying images. This problem is also caused by the quarter wave plate and the lower polarizer disposed under the outer surface of the lower substrate and other reasons.

The related art transflective liquid crystal display device has two display modes which are used separately according to whether light is reflected or transmitted. In particular, when the light is transmitted, substantially half of light emitted from the backlight is absorbed by the upper polarizer, and thus only the rest half light is used to display images. Specifically, in a reflective mode, almost all of the linearly polarized light entering from the upper substrate side is used to display bright images. In contrast, in a transmissive mode, the light traveling from the lower surface of the liquid crystal layer toward the upper substrate side must be circularly polarized in order to display images as in the reflective mode. However, half of the circularly polarized light is adsorbed by the upper polarizer while being emitted from the upper substrate to the outside. As a result, no more than substantially half of the light entering the liquid crystal layer can contribute to displaying images. The display principle of this liquid crystal display device itself originally has a factor responsible to make displayed images dark in a transmissive mode.

Also, since the light transmitted through the slits is used to display images in a transmissive mode, the brightness of displayed images depends on the ratio of the entire slit area to the entire transflective layer area (i.e., the aperture ratio). Although a larger aperture ratio enhances the brightness in a transmissive mode, it reduces the area of the transflective layer other than the apertures. Consequently, displayed images become dark in a reflective mode. The aperture ratio of the slits cannot be increased beyond a certain level, in view of ensuring bright images in the reflective mode, and hence it is limited to enhance the brightness in the transmissive mode.

According to the display principle of the transflective liquid crystal display device, since a quarter wave plate is needed under the outer surface of the lower substrate, the brightness becomes insufficient in a transmissive mode. The reason is described below. The following description refers to the structure in which dark images are displayed when a non-selection voltage is applied and bright images are displayed when a selection voltage is applied.

First, when the liquid crystal display device 100 displays dark images in a reflective mode is described with reference to the liquid crystal display device shown in FIG. 13. Light entering from outside of the upper substrate 102 passes through the upper polarizer 114 disposed above the upper substrate 102 to change to linearly polarized light having a polarization axis parallel to FIG. 13 when the polarization axis of the upper polarizer 114 is parallel to the drawing. Then, while passing through the liquid crystal 103, the light changes to substantially circularly polarized light by birefringence of the liquid crystal 103. The light is reflected at the surface of the transflective layer 104 on the lower substrate 101 to reverse the circular polarization direction thereof, and then passes through the liquid crystal 103 again to change to linearly polarized light having a polarization axis perpendicular to the drawing. Thus, the light reaches the upper substrate 102. Since the upper polarizer 114 disposed above the upper substrate 102 has a polarization axis parallel to the drawing, light reflected at the transflective layer 104 is absorbed by the upper polarizer 114, and it does not return to the outside (viewer side) of the liquid crystal display device 100. Thus, the liquid crystal display device 100 displays dark images.

On the other hand, when bright images are displayed in a reflective mode, a voltage applied to the liquid crystal 103 changes the orientation direction of the liquid crystal 103. As a result, after passing through the liquid crystal 103, light entering from the outside of the upper substrate 102 changes to linearly polarized light and is subsequently reflected at the transflective layer 104. The linearly polarized light returns to the outside (viewer side) through the upper polarizer 114 disposed above the upper substrate 102 while maintaining the polarization axis parallel to FIG. 13. Thus, the liquid crystal display device 100 displays bright images.

When the liquid crystal display device 100 displays images in a transmissive mode, light emitted from the backlight 117 enters from the outside of the lower substrate 101 to the liquid crystal 103, and part of the light is transmitted through the slits 110 to contribute to displaying images.

In this instance, in order that the liquid crystal display device 100 displays dark images, the light traveling to the upper substrate 102 through the slits 110 must be circularly polarized as in a reflective mode, as described above. Hence, in order to substantially circularly polarize the light emitted from the backlight 117 and transmitted through the slits 110, the quarter wave plate 115 is required to convert the light linearly polarized by passing through the lower polarizer 116 to circularly polarized light.

As for light not transmitted through the slits 110 in the light emitted from the backlight 117, when the polarization axis of the lower polarizer 116 is perpendicular to FIG. 13, the light emitted from the backlight 117 changes to linearly polarized light perpendicular to FIG. 13 on passing through the lower polarizer 116. Then, it passes through the quarter wave plate 115 to change to substantially circularly polarized light and reaches the transflective layer 104. The light is reflected at the lower surface of the transflective layer 104 to reverse the circular polarization direction, and passes through the quarter wave plate 115 again to change to linearly polarized light having a polarization axis parallel to the drawing. The linearly polarized light is absorbed by the lower polarizer 116 having a polarization axis perpendicular to FIG. 13. In other words, the light emitted from the backlight 117 and not transmitted through the slits 110 is reflected at the lower surface of the transflective layer 104, and is then almost completely absorbed by the lower polarizer 116 under the lower substrate 101.

In the transflective liquid crystal display device 100, as described above, almost all of the light reflected at the transflective layer 104 without passing through the slits 110 in a transmissive mode is absorbed by the lower polarizer 116 under the lower substrate 101, and therefore only part of the light emitted from the backlight 117 can be used to display images. If the light can be transmitted through the lower polarizer 116 to return to the backlight 117 without being absorbed by the lower polarizer 116, the returned light is combined with light originally emitted from the backlight 117, thus enhancing the brightness of the backlight 117 effectively. Consequently, the brightness in a transmissive mode can be enhanced. In other words, if the light reflected at the transflective layer 104 without passing through the slits 110 can be reused to display images, the brightness in the transmissive mode can be enhanced. However, this has not been achieved in the related art structure.

The present invention addresses or solves the problem described above, and provides a transflective liquid crystal display device in which the brightness in a transmissive mode is improved to have excellent visibility. The present invention also provides an electronic apparatus having the liquid crystal display device having the excellent visibility.

In order to address or achieve the above advantages, a liquid crystal display device of the present invention includes a liquid crystal cell having an upper substrate, a lower substrate opposing the upper substrate, and a liquid crystal layer held between the upper substrate and the lower substrate. A color filter layer including a plurality of pigmented films containing different color pigments and a transflective layer including cholesteric liquid crystal films to reflect part of light elliptically polarized light in a predetermined direction and to transmit part of the elliptically polarized light are disposed on the inner surface of the lower substrate, in that order. An upper elliptically polarized light transmitting device to allow elliptically polarized light to enter the liquid crystal layer from above the upper substrate and a lower elliptically polarized light transmitting device to allow elliptically polarized light to enter the liquid crystal layer from below the lower substrate are provided. The liquid crystal layer reverses the polarization of the elliptically polarized light either when a selection voltage is applied or when a non-selection voltage is applied, and does not change the polarization when the other voltage is applied. At least part of the transmission spectrum of each pigmented film included in the color filter layer overlaps with the refection spectrum of the corresponding cholesteric liquid crystal film.

Cholesteric liquid crystal has a so-called selective reflectivity which allows liquid crystal to reflect light circularly polarized in the same direction as the winding direction of the helical liquid crystal molecules and having a wavelength equivalent to the pitch of the helix. Conversely, the cholesteric liquid crystal transmits light having wavelengths that are different from the pitch of the helical molecules therein, and light circularly polarized in the direction opposite to the winding direction of the helical molecules therein even if the light has a wavelength equivalent to the pitch of the helix. Also, the cholesteric liquid crystal films of the present invention do not completely transmit, but partly reflect and partly transmit, light circularly polarized in the same direction as the winding direction of the helical molecules therein and having a wavelength equivalent to the pitch of the helix. This is one of the characteristic features of the present invention. This function allows the cholesteric liquid crystal films to serve as a transflective layer.

The inventors discovered that, in a reflective liquid crystal display device using a reflecting layer formed of cholesteric liquid crystal, which is in the related art, light can be reflected and transmitted in the same display mode by setting liquid crystal to a mode in which light entering a liquid crystal cell is elliptically polarized and in which the polarization of the elliptically polarized light is reversed either when a selection voltage is applied or when a non-selection voltage is applied, and thus images displayed in a transmissive mode do not become dark, according to the display principle. The inventors also discovered that light reflected toward the lower substrate by the selective reflectivity of the cholesteric liquid crystal in a transmissive display mode is reusable even if the structure of the outer surface side of the lower substrate is the same as the related art structure. Focusing attention on these points, the inventors have been reached the present invention.

DETAILED DESCRIPTION OF PREFERRED EMBODIMENTS

The display principle of the liquid crystal display device of the present invention and the reason why light reflected at the transflective layer is reusable is described below with reference to FIG. 3.

Figure 3:
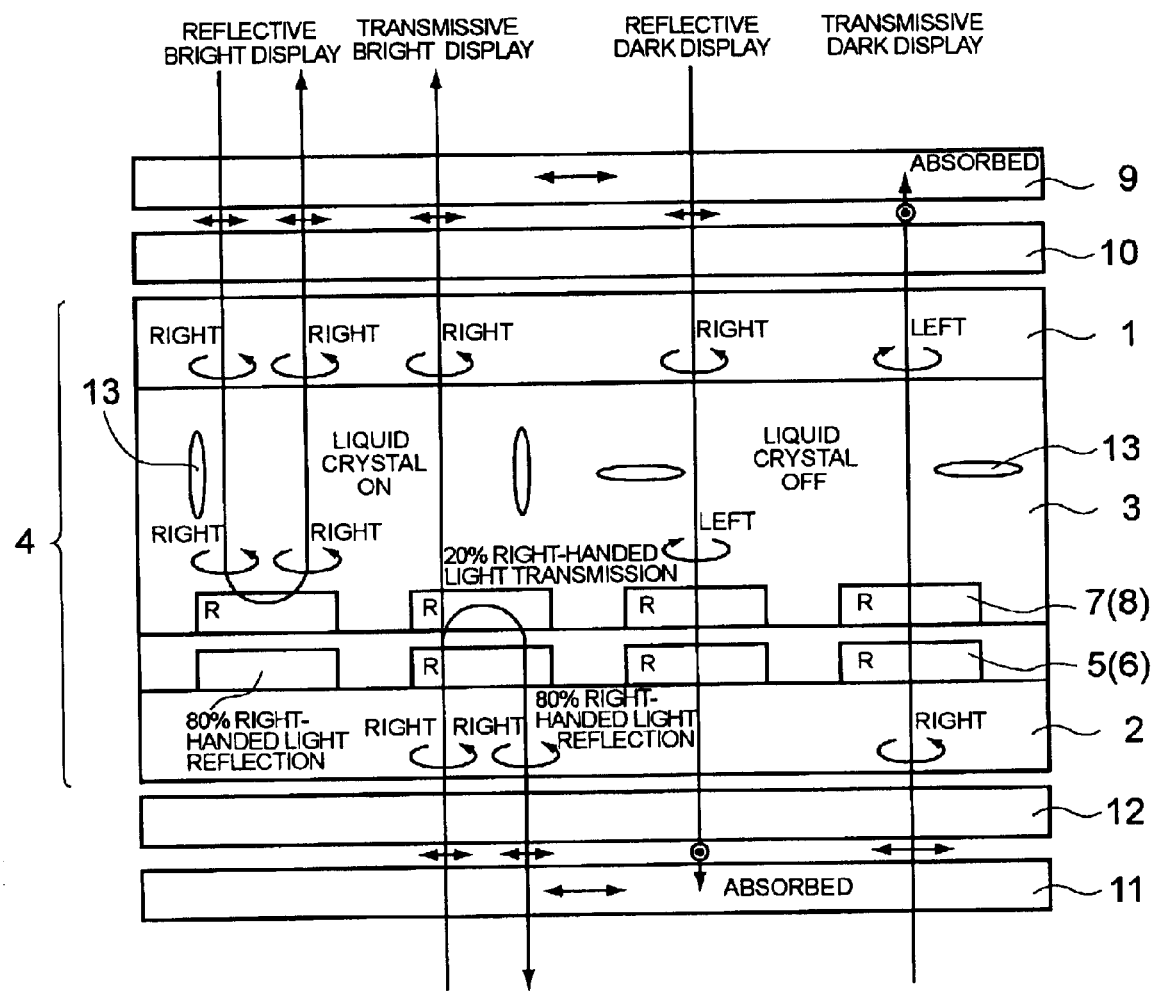
FIG. 3 is a schematic showing the display principle of the liquid crystal display device according to the first embodiment.

FIG. 3 is a schematic of the display principle of the liquid crystal display device according to the present invention.

An upper substrate 1 and a lower substrate 2 formed by a pair of light-transmitting substrates hold a liquid crystal layer 3 therebetween to form a liquid crystal cell 4. The lower substrate 2 is provided with a color filter layer 6 (hereinafter "pigmented color filter layer") including pigmented films 5 (illustrated as red (R) pigmented films in FIG. 3) and a transflective layer 7 including cholesteric liquid crystal films 8, in that order, on the inner surface thereof. The cholesteric liquid crystal films 8 reflect part of light circularly polarized in a predetermined direction and having a predetermined wavelength band (color) and transmit part of the same. In this description, for example, the cholesteric liquid crystal films 8 reflect 80% of a red light circularly polarized clockwise (hereinafter "right-handed circularly polarized light") and transmit 20% of the red light. The transmission spectrum of the pigmented films 5 of the color filter layer 6 overlaps with the reflection spectrum of the cholesteric liquid crystal films 8 overlying the pigmented films 5. In this case, the cholesteric liquid crystal films 8 to selectively reflect red light are disposed above the pigmented films 5 for transmitting the red light.

The liquid crystal display device of the present invention has an upper elliptically polarized light transmitting device to allow the elliptically polarized light to enter the liquid crystal layer 3 from the upper substrate 1 side. In FIG. 3, the upper elliptically polarized light transmitting device includes an upper polarizer 9 to transmit light linearly polarized in one direction and an upper quarter wave plate 10 to convert the linearly polarized light transmitted through the upper polarizer 9 to circularly polarized light. As shown in FIG. 3, a lower elliptically polarized light transmitting device is also provided to allow the elliptically polarized light to enter the liquid crystal layer 3 from the lower substrate 2 side. The lower elliptically polarized light transmitting device includes a lower polarizer 11 and a lower quarter wave plate 12, as in the upper substrate 1 side. At the upper substrate side and the lower substrate side, both polarization axes of the polarizers 9 and 11 extend in parallel with the drawing FIG. 3. When light linearly polarized in this direction enters the quarter wave plates 10 and 12, right-handed circularly polarized light is emitted.

The liquid crystal layer 3 is intended to reverse the polarization (rotation direction) of circularly polarized light entering the liquid crystal layer 3 according to whether a selection voltage is applied. For example, when a non-selection voltage is applied (when liquid crystal is in an off state), the liquid crystal layer 3 has a phase difference of ½ (1 is the wavelength of incident light) with the liquid crystal molecules 13 lying. Therefore, right-handed circularly polarized light entering the liquid crystal layer 3 is transmitted to change to left-handed circularly polarized light and, in contrast, left-handed circularly polarized light changes to right-handed circularly polarized light. On the other hand, when a selection voltage is applied (when the liquid crystal is in an on state) so that the liquid crystal molecules 13 rise, the phase difference disappears, and therefore the polarization (rotation direction) of the circularly polarized light does not change.

When bright images are displayed in the reflective mode in the liquid crystal display device shown in FIG. 3 (the left end in FIG. 3), light entering from outside of the upper substrate 1 passes through the upper polarizer 9 above the upper substrate 1 to change to linearly polarized light having a polarization axis parallel to FIG. 3. Then, the light passes through the upper quarter wave plate 10 to change to right-handed circularly polarized light. If the liquid crystal is in an on state, the rotation direction of the circularly polarized light does not change. Therefore, the right-handed circularly polarized light entering the liquid crystal layer 3 remains right-handed even though the light passes through the liquid crystal layer 3 to reach the transflective layer 7. A big difference between the related art transflective layer using a metallic film and the transflective layer of the present invention using the cholesteric liquid crystal is that, while the metallic transflective layer reverses the rotation direction of circularly polarized light when the light is reflected, the cholesteric liquid crystal transflective layer does not reverse the rotation direction of the circularly polarized light when the light is reflected. Specifically, while right-handed circularly polarized light reflected at the metallic transflective layer changes to left-handed circularly polarized light, right-handed circularly polarized light reflected at the cholesteric liquid crystal transflective layer remains right-handed. Therefore, 80% of the right-handed circularly polarized red light is reflected at the transflective layer 7 above the lower substrate 2 and is transmitted through the liquid crystal layer 3 again toward the upper substrate 1. Since the liquid crystal is in an on state at this time, the right-handed circularly polarized light remains right-handed. However, the light subsequently passes through the upper quarter wave plate 10 to change to linearly polarized light having a polarization axis parallel to the drawing and which is capable of passing through the upper polarizer 9. Thus, the light returns to the outside (viewer side) so that the liquid crystal display device displays bright (red) images.

In contrast, when dark images are displayed in a reflective mode (the second from the right in FIG. 3), by setting the liquid crystal to be an off state so that the liquid crystal layer 3 has a phase difference of ½, right-handed circularly polarized light entering from the upper substrate 1 side passes through the liquid crystal layer 3 to change to left-handed circularly polarized light. In FIG. 3, since the cholesteric liquid crystal films 8 of the transflective layer 7 reflect no more than part of the right-handed circularly polarized light, the transflective layer 7 transmits the left-handed circularly polarized light. Then, the light passes through the lower quarter wave plate 12 to change to linearly polarized light having a polarization axis perpendicular to FIG. 3. The linearly polarized light is then absorbed by the lower polarizer 11 and does not return to the outside (viewer side). Thus, the liquid crystal display device displays dark images.

On the other hand, when the liquid crystal display device displays images in a transmissive mode, light emitted from, for example, a backlight enters the liquid crystal cell 4 from the outside of the lower substrate 2 to contribute to displaying images. In this instance, when dark images are displayed in the transmissive mode (right end in FIG. 3), substantially the same action as in the reflective mode occurs from the lower substrate 2 side to the upper substrate 1 side. Specifically, in FIG. 3, since the lower substrate 2 has the lower polarizer 11 and the lower quarter wave plate 12 as in the upper substrate 1, right-handed circularly polarized light enters the liquid crystal layer 3 from the lower substrate 2 side, and 20% of the light passes through the transflective layer 7. If the liquid crystal is in an off state, on reaching the upper substrate 1, the light changes to left-handed circularly polarized light. Then, the light passes through the upper quarter wave plate 10 to change to linearly polarized light having a polarization axis perpendicular to FIG. 3. The linearly polarized light is then absorbed by the upper polarizer 9 and is not emitted to the outside (viewer side). Thus, the liquid crystal display device displays dark images.

When bright images are displayed in a transmissive mode (the second from the left in FIG. 3), light entering from the lower substrate 2 side passes through the lower polarizer 11 to change to linearly polarized light having a polarization axis parallel to FIG. 3, and subsequently passes through the lower quarter wave plate 12 to change to right-handed circularly polarized light. Then, the light passes through the pigmented films 5 of the pigmented color filter layer 6 to become right-handed circularly polarized red light and is emitted. The transflective layer 7 including the cholesteric liquid crystal transmits 20% of this emitted light, and if the liquid crystal is in an on state, the 20% right-handed circularly polarized light reaches the upper substrate 1, remaining right-handed. Since the right-handed circularly polarized light subsequently passes through the upper quarter wave plate 10 to change to linearly polarized light having a polarization axis parallel to FIG. 3 and which is capable of passing through the upper polarizer 9, the light returns to the outside (viewer side) so that the liquid crystal display device displays bright (red) images.

On the other hand, 80% of the right-handed circularly polarized red light transmitted through pigmented films 5 of the pigmented color filter layer 6 is reflected at the transflective layer 7 in the downward direction when bright images are displayed in the transmissive mode. Since, at this point, the cholesteric liquid crystal does not change the rotation direction of the reflected circularly polarized light, as described above, the reflected light is right-handed circularly polarized light. Therefore, the light subsequently passes through the lower quarter wave plate 12 to change to linearly polarized light having a polarization axis parallel to FIG. 3. This linearly polarized light passes through the lower polarizer 11 having polarization axis parallel to the drawing. Thus, the linearly polarized light having the same polarization axis as that of the lower polarizer 11 is emitted from the lower substrate 2 side. Then, the light is reflected at, for example, a reflector provided at the backlight, and enters the liquid crystal cell 4 again to be reused to display images.

Although the description is omitted, when dark images are displayed in the transmissive mode, 80% of the right-handed circularly polarized light transmitted trough the pigmented films 5 of the pigmented color filter layer 6 is, also, reflected at the transflective layer 7 including the cholesteric liquid crystal to be emitted to the outside of the liquid crystal cell 4 from the lower substrate 2 side once, and then enters the liquid crystal cell 4 again. However, since the light is absorbed by the upper polarizer 9, the light does not affect dark images. Also, since, when bright images are displayed in a reflective mode, 20% of right-handed circularly polarized light entering from above passes through the transflective layer 7, the light is emitted to the outside of the liquid crystal cell 4 from the lower substrate 2 side once, and then enters the liquid crystal cell 4 again. The light contributes to displaying images, thus maintaining bright images in the reflective mode.

As described above, the liquid crystal display device of the present invention can reflect and transmit light in the same display mode. In particular, when bright images are displayed in a transmissive mode, a large amount of light transmitted through the transflective layer including the cholesteric liquid crystal contributes to displaying images without the upper polarizer absorbing part of the light entering from the lower substrate side. Also, light reflected at the transflective layer including the cholesteric liquid crystal is reused to display images. The ratio of the reflection to the transmission, i.e., a reflection ratio of 80% and a transmission ratio of 20%, of the cholesteric liquid crystal is only described as an example, and the ratio of the reflection to the transmission may be varied. However, regardless of the ratio, circularly polarized light transmitted through the transflective layer including the cholesteric liquid crystal can be fully used, and circularly polarized light reflected at the transflective layer can also be reused to display images. These effects enhance the brightness of transmissive display images while maintaining the brightness of reflective display images. Thus, a transflective liquid crystal display device having excellent visibility can be achieved.

The above-described light entering from the upper substrate side and lower substrate side is illustrated as an ideal example, or "(right-handed) circularly polarized light". However, it is not necessarily circularly polarized in order to realize the above-described function of the liquid crystal display device of the present invention, as long as it is "elliptically polarized light" in a broad sense.

Preferably, the liquid crystal display device of the present invention may further have an illumination device to emit light to the liquid crystal cell from below the lower substrate.

In order that the transmissive display mode and the reflective display mode are the same in the liquid crystal display device of the present invention, elliptically polarized light must be emitted from below the lower substrate by some method. Any possible method can be used for that purpose, and by providing an illumination device to emit light to the liquid crystal cell from the lower substrate side, i.e., a so-called backlight, a structure allowing elliptically polarized light to enter from the lower substrate side can be readily achieved.

The upper elliptically polarized light transmitting device and the lower elliptically polarized light transmitting device may each include a polarizer to transmit light linearly polarized in one direction and a retardation layer to change the linearly polarized light transmitted through the polarizer to elliptically polarized light.

By disposing these two optical members at upper substrate side and the lower substrate side, outside light, such as sunlight or illumination light, and illumination light from the backlight are easily changed to elliptically polarized light. This is preferable to the liquid crystal display device of the present invention.

The retardation layer can have any phase difference, but preferably it is a quarter wave plate.

Since the quarter wave plate changes linearly polarized light emitted from the polarizer into elliptically polarized light, and particularly into circularly polarized light, the light use efficiency increases most, and thus the liquid crystal display device can display brighter images. If the upper retardation layer disposed above the upper substrate needs a color compensation function, however, the quarter wave plate is not necessarily used as the retardation layer, and any retardation film having a desired phase difference can be used.

The cholesteric liquid crystal films may each serve as a reflective color filter, in a predetermined region, to selectively reflect colored light having a wavelength corresponding to the pitch of helical liquid crystal molecules therein, and at least part of the reflection spectrum of each cholesteric liquid crystal film overlaps with the transmission spectrum of the corresponding pigmented film included in the color filter layer. In other words, the color of light reflected at the cholesteric liquid crystal films and the color of light transmitted through the pigmented films of the color filter layer are the same.

The cholesteric liquid crystal films for the liquid crystal display device of the present invention may be multilayer films in which a plurality of cholesteric liquid crystal films including helical liquid crystal molecules having different pitches are laminated. Thus, the cholesteric liquid crystal films can serve as so-called white reflectors, which reflect circularly polarized light having various wavelengths. Also, by setting the pitches of the helical liquid crystal molecules in cholesteric liquid crystal films different from one another, the cholesteric liquid crystal films can each serve as a reflective color filter to reflect, for example, red (R), green (G), or blue (B) light. According to the display principle described above, by using this cholesteric liquid crystal films serving as the reflective color filters, a displayed image can have different colors by dot in the display region. In this instance, the cholesteric liquid crystal films mainly serve as reflective display color filters, and the pigmented films of the color filter layer mainly serve as transmissive display color filters.

The liquid crystal display device may further include, at the predetermined regions between the lower substrate and the color filter layer, additional cholesteric liquid crystal films to reflect at least part of colored light having wavelengths outside of the reflection spectrum of the respective cholesteric liquid crystal films of the transflective layer. In other words, the liquid crystal display device may further include, in predetermined regions between the lower substrate and the color filter layer, additional cholesteric liquid crystal films to reflect at least part of light having a color complementary to the color of light transmitted through the respective pigmented films of the color filter layer. The function and the effect of the additional cholesteric liquid crystal films is described below with reference to FIG. 4.

Figure 4:
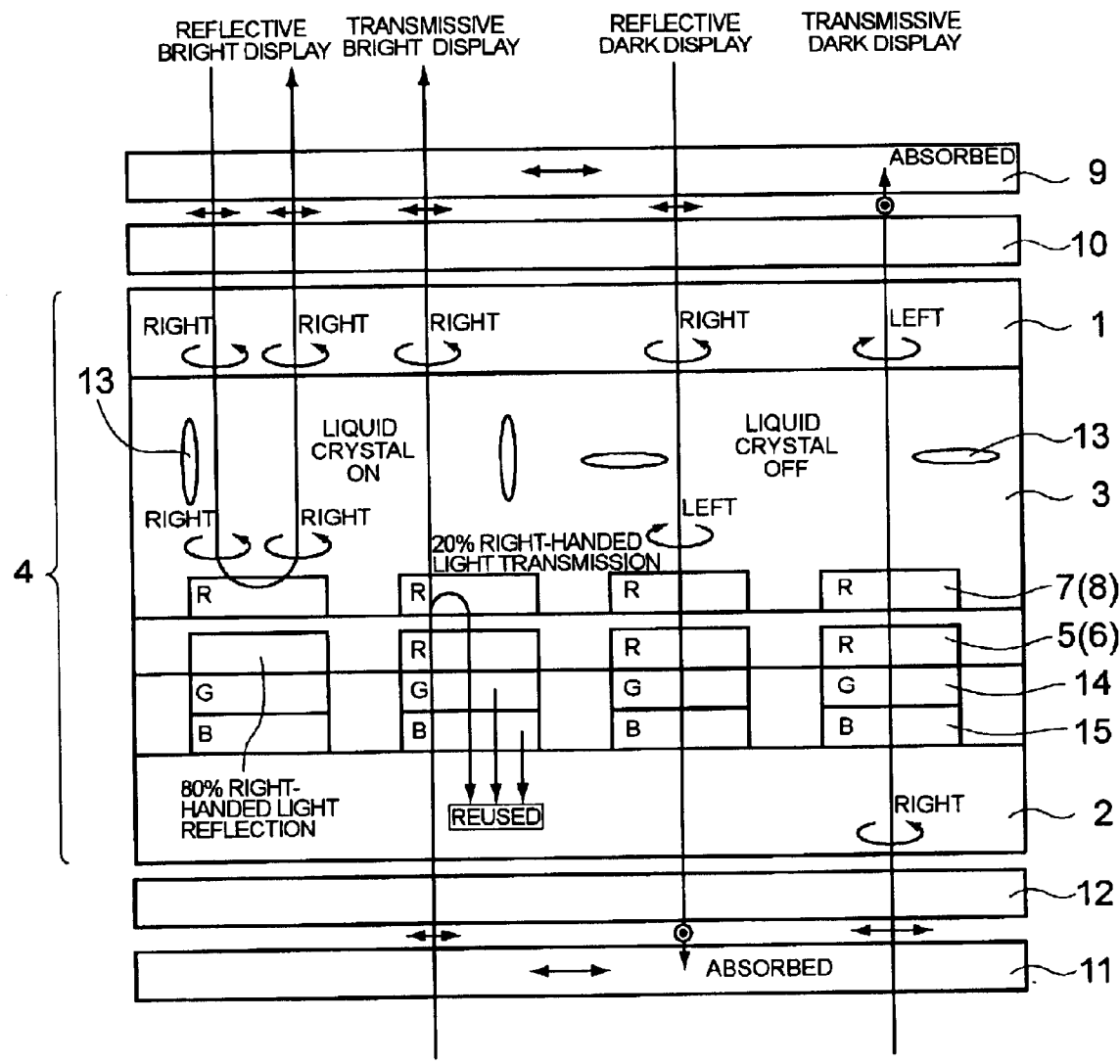
FIG. 4 is a schematic showing the display principle of the liquid crystal display device according to the second embodiment.

FIG. 4 is different from FIG. 3 in that additional cholesteric liquid crystal films to selectively reflect colored light having wavelengths outside the reflection spectrum of the cholesteric liquid crystal films included in the transflective layer are disposed under the pigmented color filter layer formed above the lower substrate. Specifically, the additional cholesteric liquid crystal films selectively reflect light having a color complementary to the color of light transmitted through the pigmented films of the color filter layer. In FIG. 4, the color of light reflected at the cholesteric liquid crystal films included in the transflective layer and the color of light transmitted through the pigmented color filter layer are red (R), and additional two-layered cholesteric liquid crystal films to selectively reflect green (G) and blue (B) lights are deposited. The following description only illustrates parts changed by providing the additional cholesteric liquid crystal films, and the display principle, which is basically the same as in FIG. 3, is not described.

As for a reflective mode, circularly polarized red light from the upper substrate 1 side toward the lower substrate 2 is transmitted through the pigmented films 5 of the pigmented color filter layer 6 and passes through cholesteric liquid crystal films 14 to selectively reflect green light and cholesteric liquid crystal films 15 to selectively reflect blue light. Also, green light and blue light are selectively reflected at the respective lower cholesteric liquid crystal films 14 and 15 to travel toward the upper substrate 1 side again. However, this light is absorbed by the red pigmented films 5 of the pigmented color filter layer 6 and is not emitted to the liquid crystal layer 3. In the reflective mode, therefore, the display principle is substantially the same as in the description above.

Next, the function and the effect of the lower cholesteric liquid crystal films 14 and 15 in a transmissive mode is described below with reference to the case where bright images are displayed (the second from the left in FIG. 4). Light passes through the lower quarter wave plate 12 to change to right-handed circularly polarized light. Then, right-handed circularly polarized blue light and right-handed circularly polarized green light are reflected at the cholesteric liquid crystal films 15 and 14, respectively. On the other hand, right-handed circularly polarized red light passes through the cholesteric liquid crystal films 14 and 15 and subsequently through the red pigmented films 5 of the pigmented color filter layer 6, and then 80% of the light is reflected at the transflective layer 7.

In the case of FIG. 3 where no lower cholesteric liquid crystal film is provided, all the right-handed circularly polarized light emitted from the lower quarter wave plate 12 enters the red pigmented films 5 of the pigmented color filter layer 6. Green and blue light components of the entered light are absorbed by the red pigmented films 5 and are not, therefore, reused. In contrast, in the case of FIG. 4 where the lower cholesteric liquid crystal films 14 and 15 are provided, right-handed circularly polarized light emitted from the lower quarter wave plate 12 enters the cholesteric liquid crystal films 14 and 15 before entering the red pigmented films 5 of the pigmented color filter layer 6. Therefore, the green and blue light components of the light are reflected without being absorbed by the red pigmented films 5, thus being reused as well as red light components reflected at the transflective layer 7. As a result, the reuse efficiency increases, and thus brighter transmissive display images can be displayed.

An electronic apparatus of the present invention includes a liquid crystal display device of the present invention described above.

In this structure, an electronic apparatus can be achieved which includes a liquid crystal display device having excellent visibility and capable of displaying bright images even in a transmissive mode.

[First Embodiment]

A first embodiment will now be described with reference to FIG. 1.

Figure 1:
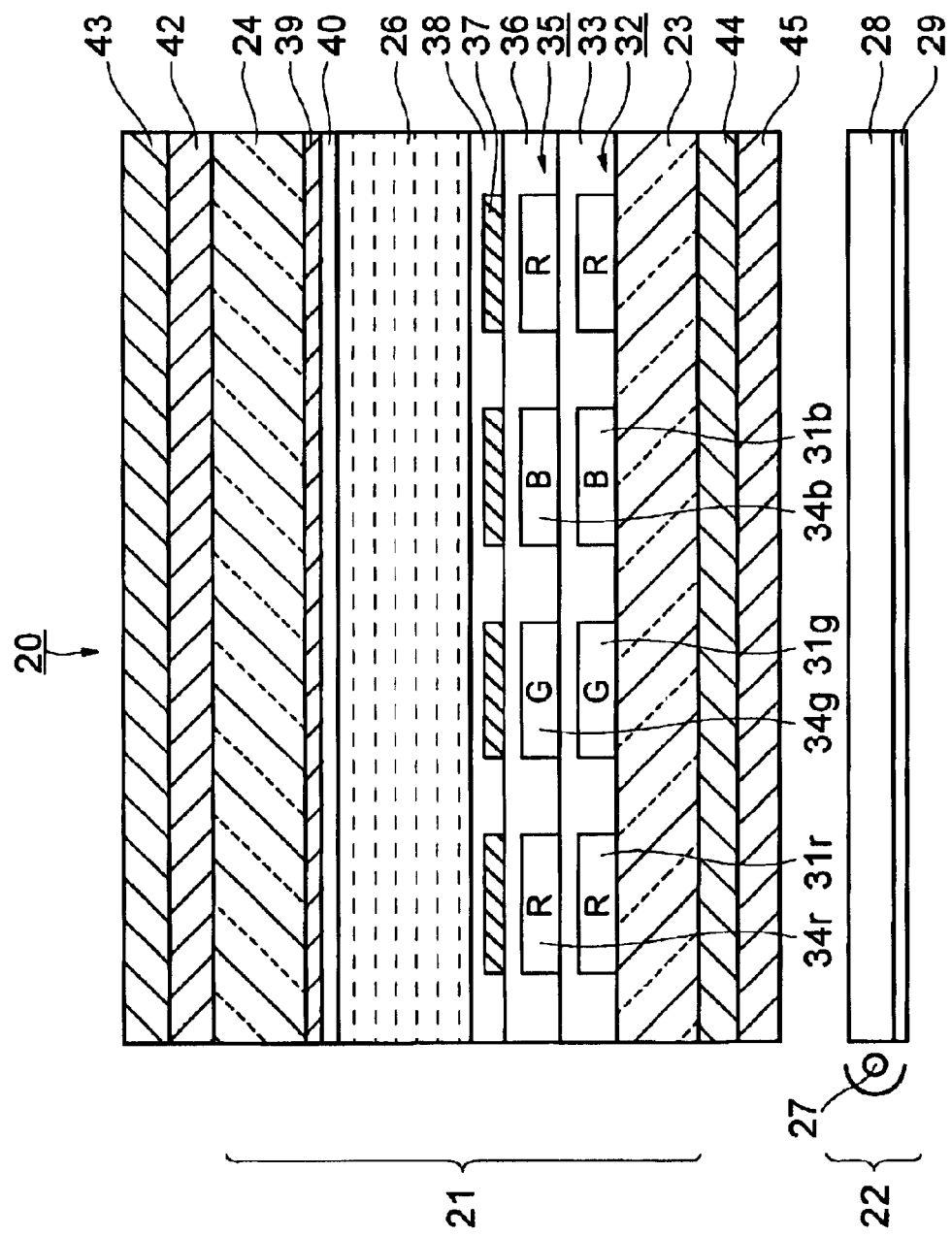
FIG. 1 is a sectional view of a liquid crystal display device according to a first embodiment of the present invention.

FIG. 1 is a sectional view of a liquid crystal display device according to the first embodiment, and shows an exemplary transflective liquid crystal color display device. In order to make it easy to understand the following drawings, thicknesses, dimensional ratios, and the like of the components are changed if necessary.

A liquid crystal display device 20 according to the present embodiment has a liquid crystal cell 21 and a backlight 22 (illumination device), as shown in FIG. 1. The liquid crystal cell 21 has a lower substrate 23 and an upper substrate 24 opposing each other and a liquid crystal layer 26 held between the lower substrate 23 and the upper substrate 24. The liquid crystal layer 26 is formed of, for example, STN (super twisted nematic) liquid crystal whose phase difference is set at ½. The backlight 22 is disposed at the backside (the outer surface side of the lower substrate 23) of the liquid crystal cell 21. The backlight 22 includes a light source 27, such as an LED (light-emitting diode), a light guide plate 28, and a reflector 29, and the like.

A pigmented color filter layer 32 including pigmented films 31r, 31g, and 31b containing, for example, respective color pigments R, G, and B is formed on the inner surface of the lower substrate 23 formed of a light-transmitting material, such as glass or plastics. A transflective layer 35 including cholesteric liquid crystal films 34r, 34g, and 34b to selectively reflect light of the respective colors R, G, and B is formed above the pigmented color filter layer 32 with an overcoat layer 33 therebetween. Each of the cholesteric liquid crystal films 34r, 34g, and 34b reflects part of the corresponding colored light circularly polarized in a predetermined direction. Specifically, it reflects, for example, 80% of a right-handed circularly polarized light and transmits 20% of the light. The ratio of the reflection to the transmission is set in the range of 8:2 to 1:9. The ratio may be set by controlling the thickness of the cholesteric liquid crystal films 34r, 34g, and 34b.

The transmission spectrums of the pigmented films 31r, 31g, and 31b of the pigmented color filter layer 32 substantially overlap with the reflection spectrums of the respective cholesteric liquid crystal films 34r, 34g, and 34b overlying the pigmented color filter layer 32. Specifically, the cholesteric liquid crystal film 34r to selectively reflect red light overlies the pigmented film 31r to transmit red light; the cholesteric liquid crystal film 34g to selectively reflect green light overlies the pigmented film 31g to transmit green light; and the cholesteric liquid crystal film 34b to selectively reflect blue light overlies the pigmented film 31b to transmit blue light. The cholesteric liquid crystal films 34r, 34g, and 34b are each intended to selectively reflect light having a wavelength corresponding to the pitch of the helical liquid crystal molecules thereof. The helical pitch can be locally controlled by, for example, changing the intensity of ultraviolet light or the temperature when the cholesteric liquid crystal is hardened. A cholesteric liquid crystal film having a helical pitch set at about 450 nm selectively reflects blue light; a cholesteric liquid crystal film having a helical pitch set at about 550 nm selectively reflects green light; and a cholesteric liquid crystal film having a helical pitch set at about 650 nm selectively reflects red light. Thus, all the cholesteric liquid crystal films serve as reflective color filters.

While the cholesteric liquid crystal films 34r, 34g, and 34b mainly serve as color filters to produce colors of reflective display images, the pigmented color filter layer 32 mainly serves as color filters to produce colors of transmissive display images. The pigmented films 31r, 31g, and 31b of these pigmented color filter layer 32 and the cholesteric liquid crystal films 34r, 34g, and 34b overlying the pigmented films may be patterned in plan view as in related art color filter patterns, such as a stripe pattern, a mosaic pattern, and a delta pattern.

Lower electrodes 37 are formed of a transparent conductive film, such as ITO, on the overcoat layer 36 formed on the transflective layer 35, at the inner surface side of the lower substrate 23. An alignment layer 38 is formed of a resin, such as polyimide, on the lower electrodes 37. Also, at the inner surface side of the upper substrate 24, an upper electrode 39 is formed of a transparent conductive film, such as ITO, and an alignment layer 40 is formed of a resin, such as polyimide, on the upper electrode 39. The lower electrodes 37 and the upper electrode 39 may be structured by an active matrix system using switching elements, such as thin film transistors (TFTs) and thin film diodes (TFDs), or by a passive matrix system.

An upper retardation layer 42 and an upper polarizer 43 (both defining an upper elliptically polarized light transmitting device) are formed at the outer surface side of the upper substrate 24, in that order from the substrate side. Also, a lower retardation layer 44 and a lower polarizer 45 (both defining a lower elliptically polarized light transmitting device) are formed at the outer surface side of the lower substrate 23, in that order from the substrate side. The upper and lower retardation layers 42 and 44 and polarizers 43 and 45 are intended to allow light circularly polarized in a predetermined direction to enter the liquid crystal layer 26. According to the display principle of the liquid crystal display device of the present invention, the rotation directions of circularly polarized light entering from the upper substrate 24 side and circularly polarized light entering from the lower substrate 23 side must be substantially the same. Hence, the directions of the polarization axes of the upper polarizer 43 and the lower polarizer 45 must be substantially the same, as in FIG. 1, where both the directions are parallel to FIG. 1. If the upper retardation layer 42 disposed above the upper substrate 24 needs a color compensation function, however, a quarter wave plate is not necessarily used as the retardation layer, and any retardation film having a desired phase difference can be used.

The display principle of the liquid crystal display device 20 having the above-described structure has already been described in the Summary of the Invention section of this application, and is not repeated. As described above, the liquid crystal display device 20 of the present embodiment can reflect and transmit light in the same display mode. In particular, when bright images are displayed in a transmissive mode, most of the light transmitted through the transflective layer 35 including the cholesteric liquid crystal films 34r, 34g, and 34b contributes to displaying images without the upper polarizer absorbing part of the light entering from below the lower substrate 23, not as in the related art transflective liquid crystal display device. Light reflected at the transflective layer 35 including the cholesteric liquid crystal films 34r, 34g, and 34b and thus not entering the liquid crystal layer 26 can be reused for transmissive display images. Thus, the effect of fully using circularly polarized light transmitted through the transflective layer 35 including the cholesteric liquid crystal films 34r, 34g, and 34b and the effect of reusing circularly polarized light reflected at the transflective layer 35 to display images enhances the brightness of transmissive display images while maintaining the brightness of reflective display images. Thus, a transflective liquid crystal display device having excellent visibility can be achieved.

[Second Embodiment]

A second embodiment is described below with reference to FIG. 2.

Figure 2:
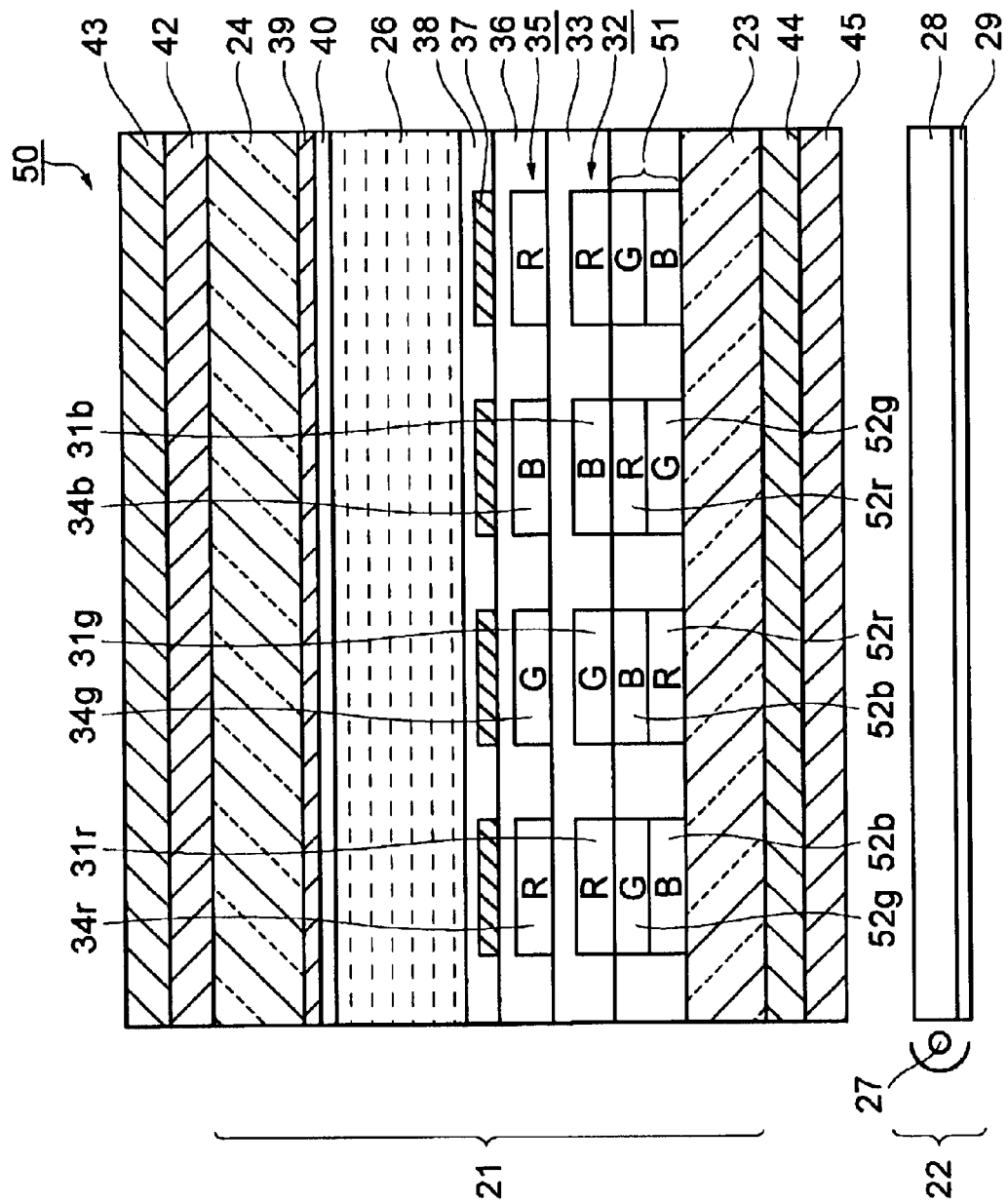
FIG. 2 is a sectional view of a liquid crystal display device according to a second embodiment of the present invention.

FIG. 2 is a sectional view of a liquid crystal display device according to the second embodiment. The fundamental structure of a liquid crystal display device of the present embodiment is the same as in the first embodiment except that additional cholesteric liquid films are further provided under the pigmented color filter layer. In FIG. 2, the same parts as in FIG. 1 are designated by the same reference numerals and the description is not repeated.

As shown in FIG. 2, a liquid crystal display device 50 of the second embodiment has a cholesteric liquid crystal layer 51 to selectively reflect colored light having wavelengths outside the reflection spectrum of the cholesteric liquid crystal films 34r, 34g, and 34b included in the transflective layer 35, between the lower substrate 23 and the pigmented color filter layer 32. Specifically, the cholesteric liquid crystal layer 51 selectively reflects light having colors complementary to the colors of light transmitted through the pigmented films 31r, 31g, and 31b of the pigmented color filter layer 32.

Specifically, in FIG. 2, the region (34r and 31r) where the color of light reflected at the cholesteric liquid crystal films of the transflective layer 35 and the color of light transmitted through the pigmented color filter layer 32 are red (R) has two-layered cholesteric liquid crystal films 52g and 52b to selectively reflect green (G) light and blue (B) light, respectively; the region (34g and 31g) where the color of light reflected at the cholesteric liquid crystal films of the transflective layer 35 and the color of light transmitted through the pigmented color filter layer 32 are green (G) has two-layered cholesteric liquid crystal films 52b and 52r to selectively reflect blue (B) light and red (R) light, respectively; and the region (34b and 31b) where the color of light reflected at the cholesteric liquid crystal films of the transflective layer 35 and the color of light transmitted through the pigmented color filter layer 32 are blue (B) has two-layered cholesteric liquid crystal films 52r and 52g to selectively reflect red (R) light and green (G) light, respectively. As long as the colors of light transmitted through the pigmented films 31r, 31g, and 31b are complementary to the colors of the light selectively reflected at the cholesteric liquid crystal layer 51, the cholesteric liquid crystal layer 51 may be formed of single-layered cholesteric liquid crystal films, instead of the two-layered cholesteric liquid crystal films. For example, single-layered cholesteric liquid crystal films to selectively reflect cyanic light, magenta light, and yellow light are disposed at the regions transmitting red (R) light, green (G) light, and blue (B) light, respectively. Also, the cholesteric liquid crystal layer 51 may be formed of three or more layers including cholesteric liquid crystal films which selectively reflect light of complementary colors.

The display principle of the liquid crystal display device 50 according to the present embodiment has also been described in the Summary of the Invention section of this application, and is not repeated. In the liquid crystal display device 50 according to the present embodiment, circularly polarized light emitted from the lower retardation layer 44 in the transmissive display mode enters the cholesteric liquid crystal layer 51 before entering pigmented films 31r, 31g, and 31b of the pigmented color filter layer 32. Therefore, components of circularly polarized colored light complementary to the colors of the pigmented films 31r, 31g, and 31b of the pigmented color filter layer 32 are reflected at the cholesteric liquid crystal films 52r, 52g, and 52b without being absorbed by the pigmented films 31r, 31g, and 31b, thus being reused. As a result, light reuse efficiency increases as a whole, and thus brighter transmissive display images can be displayed.

[Third Embodiment]

A third embodiment is described below with reference to FIG. 5.

Figure 5:
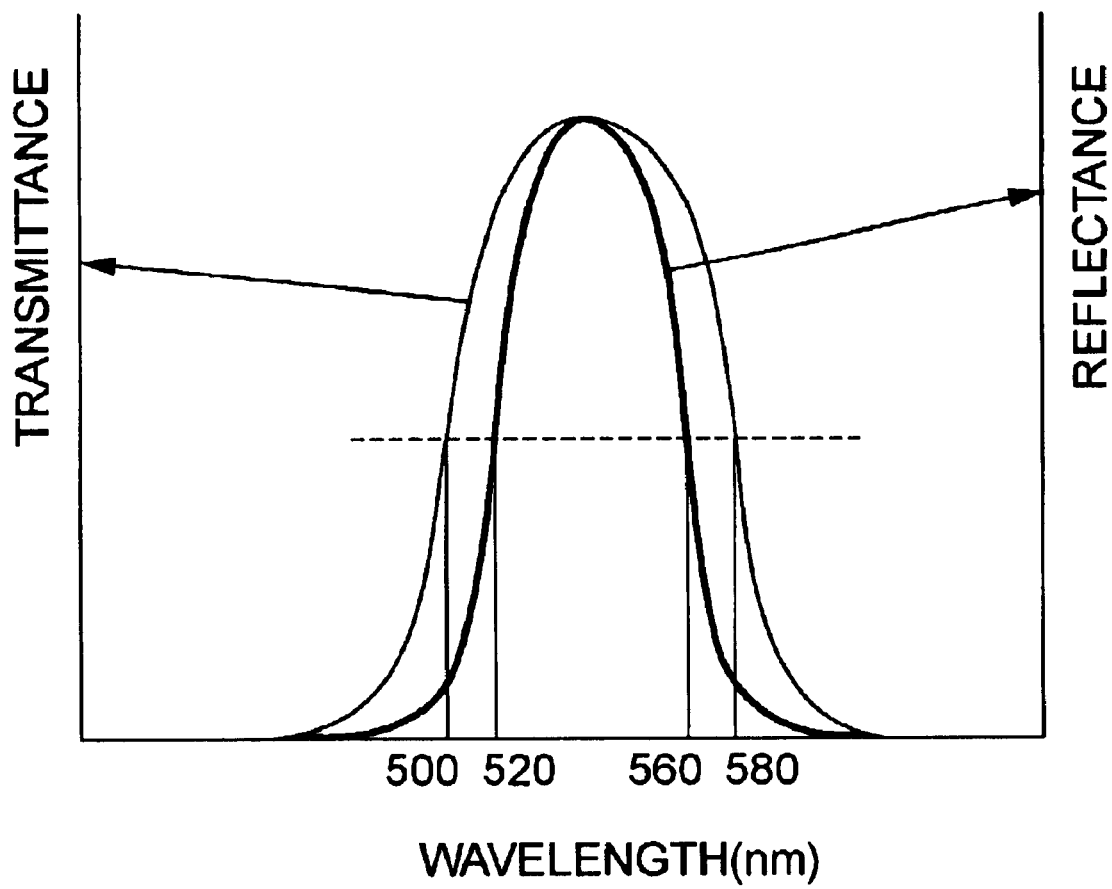
FIG. 5 is a graph showing a transmission-reflection distribution of a color filter according to a third embodiment.

FIG. 5 shows the reflection spectrum around 550 nm of cholesteric liquid crystal films and the transmission spectrum around 550 nm of a pigmented color filter, according to the third embodiment. Specifically, a region corresponding to a green (G) pigmented film of the pigmented color filter is shown. Although only the green (G) region is described here, red (R) and blue (B) regions are the same. Light having transmission wavelengths emitted from a backlight is transmitted through the regions not having the reflection spectrum. The fundamental structure of a liquid crystal display device of the present embodiment is the same as in the first embodiment except that the reflection spectrum of the cholesteric liquid crystal films disposed above the pigmented color filter layer is narrower than the transmission spectrum of the pigmented color filter layer. It is defined here that a reflection spectrum narrower than a transmission spectrum means that the band width between wavelengths corresponding to half the transmittance (referred to as the "half band width of the transmission spectrum") includes the half band width of the reflection spectrum. Specifically, FIG. 5 shows that the half band width of the transmission spectrum is in the range of 500 to 580 nm and that the half band width of the reflection spectrum is in the range of 520 to 560 nm, and hence represents the third embodiment. The structure of the third embodiment is the same as in FIG. 1 and the description is not repeated.

Since the band width of a selective reflection spectrum is proportional to the refractive index anisotropy Δn of a cholesteric liquid crystal film, a smaller band width of the reflection spectrum is realized by setting the refractive index anisotropy Δn to be small.

By setting the reflection spectrum of the cholesteric liquid crystal films 34r, 34g, and 34b to be narrower than the transmission spectrum of the pigmented color filter layer 32, the transmittance can be increased.

[Fourth Embodiment]

A fourth embodiment is described below with reference to FIG. 6.

Figure 6:
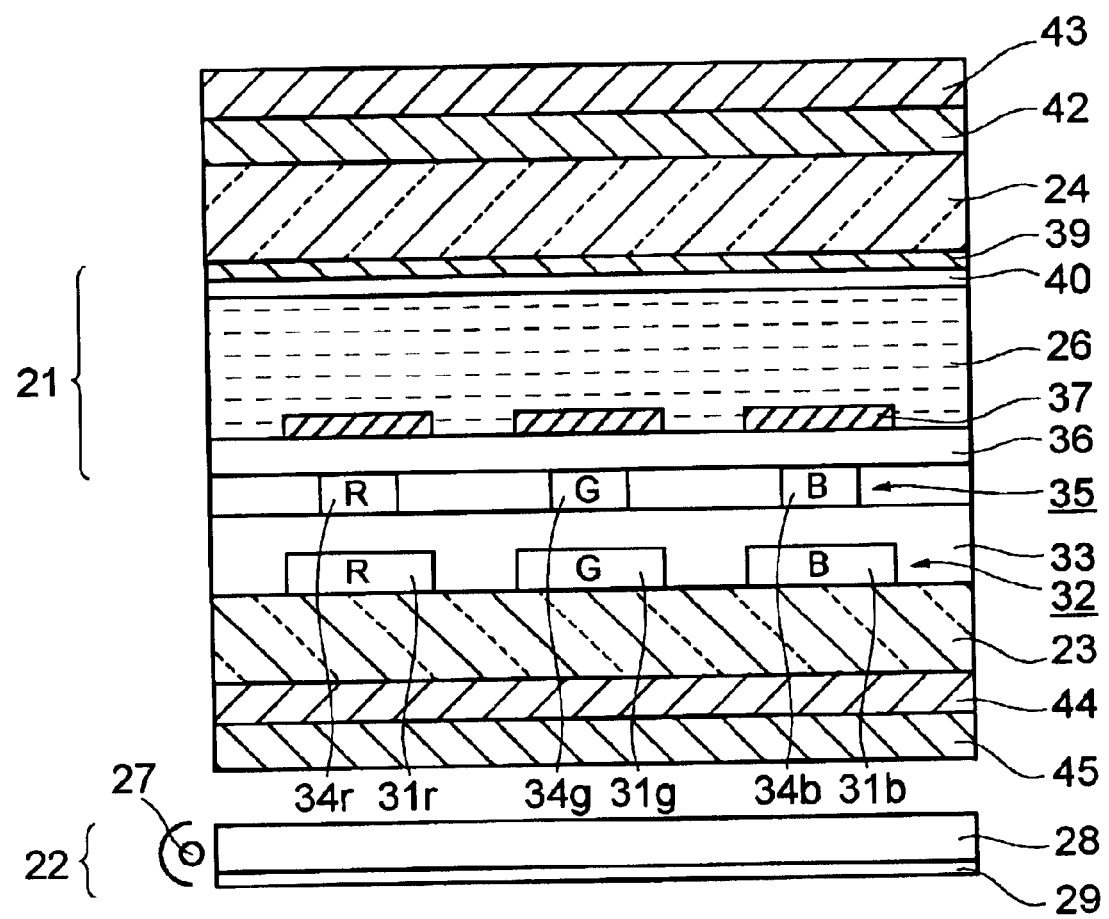
FIG. 6 is a sectional view of a liquid crystal display device according to a fourth embodiment.

FIG. 6 is a sectional view of a liquid crystal display device according to the present embodiment. The fundamental structure of a liquid crystal display device of the present embodiment is the same as in the first embodiment except that the area of the cholesteric liquid crystal layer disposed above the pigmented color filter layer is set smaller than that of the pigmented color filter layer, and the cholesteric liquid crystal layer and the pigmented color filter layer are separated by a light-transmitting layer. In FIG. 6, the same parts as in FIG. 1 are designated by the same reference numerals and the description is not repeated.

In this structure, above the pigmented color filter layer, the regions not having the cholesteric liquid crystal layer thereabove are present, and the pigmented color filter layer is covered with the light-transmitting layer. Light emitted from the backlight can pass through these regions to enter the liquid crystal layer without being reflected at the cholesteric liquid crystal films. Thus, the transmittance can be increased.

[Fifth Embodiment]

A fifth embodiment of the present invention is described below with reference to FIG. 7.

Figure 7:
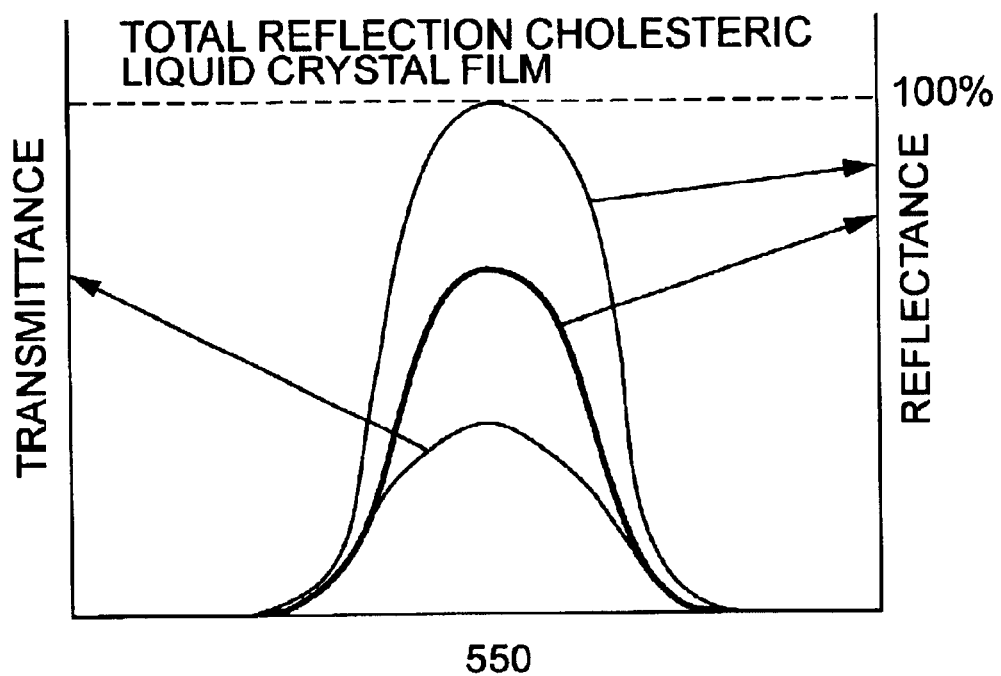
FIG. 7 is a graph showing a transmission-reflection distribution of a color filter according to a fifth embodiment.

FIG. 7 shows the reflection spectrum around 550 nm of cholesteric liquid crystal films and the transmission spectrum around 550 nm of a pigmented color filter, according to the fifth embodiment. The fundamental structure of a liquid crystal display device of the present embodiment is the same as in the first embodiment except that the cholesteric liquid crystal films are formed so as to reflect and transmit light having specific wavelengths. The structure of the present embodiment is the same as in FIG. 1 and the description is not repeated.

The cholesteric liquid crystal films of the present embodiment are formed so as to reflect and transmit light having specific wavelengths. In order to realize this formation, the cholesteric liquid crystal films are formed so as to have a thickness smaller than that of cholesteric liquid crystal films for reflecting the entire light having specific wavelengths. In this structure, the amount of illumination light from the backlight transmitted through the cholesteric liquid crystal films can be increased, and thus bright images can be expected.

[Sixth Embodiment]

A sixth embodiment of the present invention is described below with reference to FIG. 8.

Figure 8:
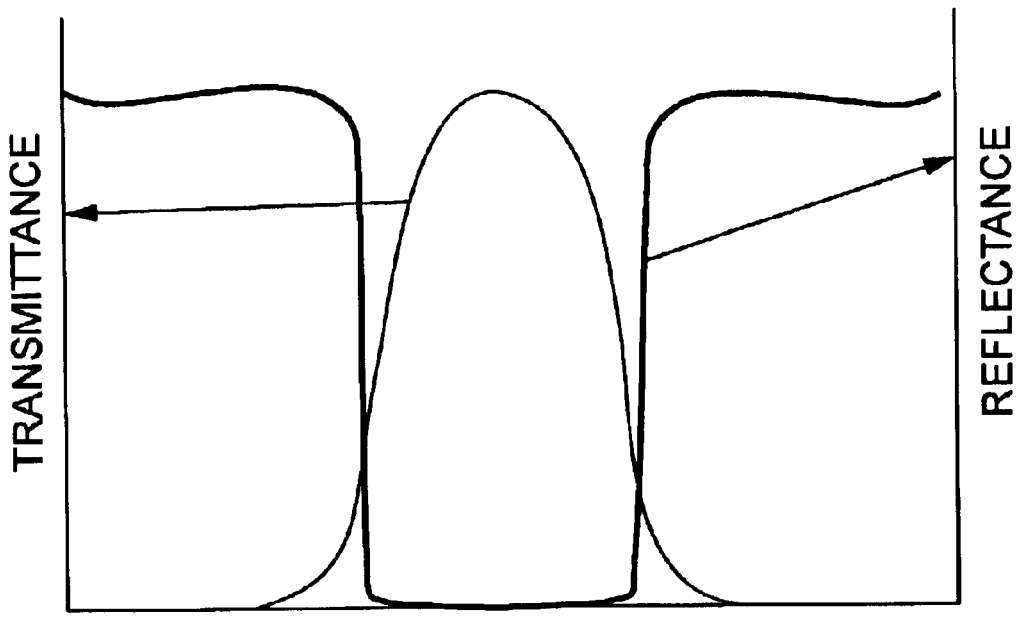
FIG. 8 is a graph showing a transmission-reflection distribution of a color filter according to a sixth embodiment.

FIG. 8 shows the reflection spectrum around 550 nm of cholesteric liquid crystal films and the transmission spectrum around 550 nm of a pigmented color filter, according to the sixth embodiment. The fundamental structure of a liquid crystal display device of the present embodiment is the same as in the second embodiment except that the reflection spectrum of the cholesteric liquid crystal layer disposed between the lower substrate and the pigmented color filter layer is narrower than the spectrum complementary to the transmission spectrum of the pigmented films of the pigmented color filter layer. The structure of the present embodiment is the same as in FIG. 2 and the description is not repeated.

In the present embodiment, by setting the reflection spectrum of the cholesteric liquid crystal layer disposed between the lower substrate and the pigmented color filter layer to be narrower than the spectrum complementary to the transmission spectrum of the pigmented films of the pigmented color filter layer, light emitted from the backlight other than green (G) light can return to the backlight side without being absorbed by the pigmented color filter layer, and thus the light can be reused. Also, color mixture is reduced or prevented in reflective display images. As a result, light reuse efficiency increases as a whole, and thus brighter transmissive display images can be displayed. Although only the green (G) wavelength band is described here, red (R) and blue (B) wavelength bands are also the same.

[Seventh Embodiment]

A seventh embodiment is described below with reference to FIG. 9.

Figure 9:
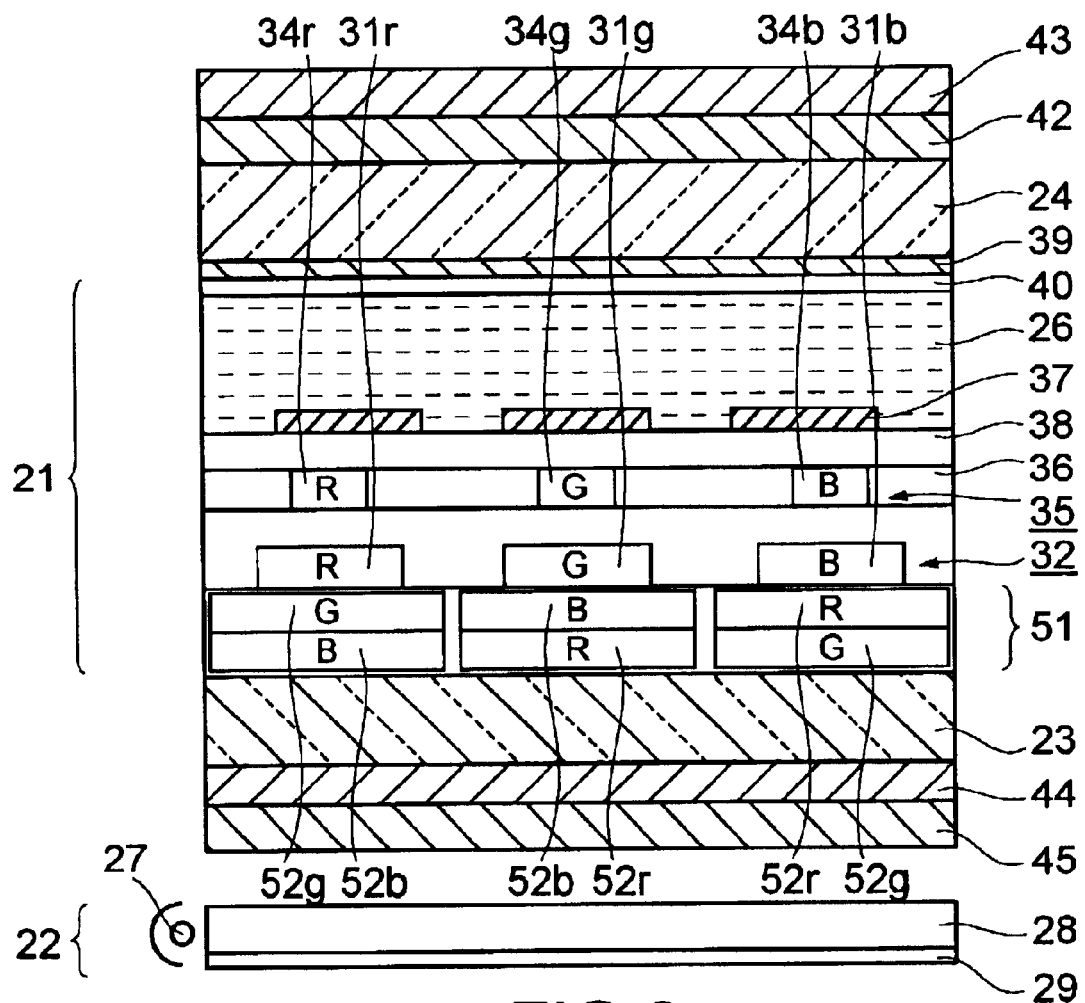
FIG. 9 is a sectional view of a liquid crystal display device according to a seventh embodiment.

FIG. 9 is a sectional view of a liquid crystal display device according to the seventh embodiment. The fundamental structure of a liquid crystal display device according to the present embodiment is the same as in the second embodiment except that the area of the cholesteric liquid crystal films disposed between the lower substrate and the pigmented color filter layer is larger than the area of the pigmented films of the pigmented color filter layer. In FIG. 9, the same parts as in FIG. 2 are designated by the same reference numerals and the description is not repeated.

In the present embodiment, by setting the area of the cholesteric liquid crystal films disposed between the lower substrate and the pigmented color filter layer to be larger than the area of the pigmented films of the pigmented color filter layer, light emitted from the backlight can return to the backlight side without being absorbed by the pigmented color filter layer, and thus the light can be reused. As a result, light reuse efficiency increases as a whole, and thus brighter transmissive display images can be displayed.

[Electronic Apparatus]

Exemplary electronic apparatuses having the liquid crystal display device according the embodiments are described below.

Figure 10:
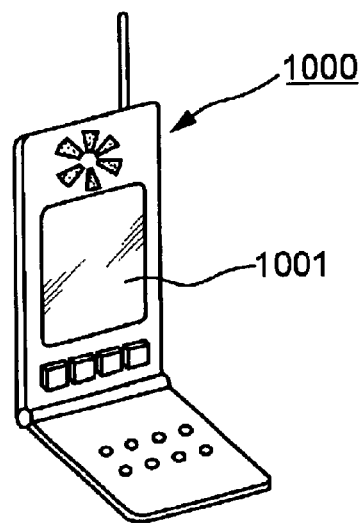
FIG. 10 is a perspective view of an electronic apparatus of the present invention.

FIG. 10 is a perspective view of an exemplary cellular telephone. In FIG. 10, numeral 1000 designates the main body of a cellular phone and numeral 1001 designates a liquid crystal display using the liquid crystal display device described above.

Figure 11:
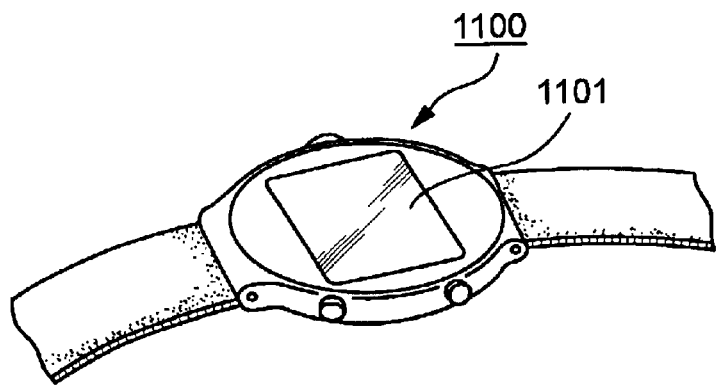
FIG. 11 is a perspective view of another electronic apparatus of the present invention.

FIG. 11 is a perspective view of an exemplary wrist watch-type electronic apparatus. In FIG. 11, numeral 1100 designates the main body of a wrist watch and numeral 1101 designates a liquid crystal display using the liquid crystal display device described above.

Figure 12:
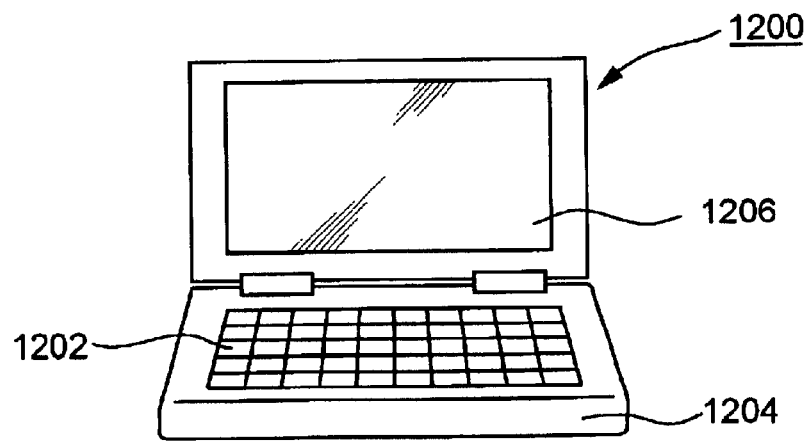
FIG. 12 is a perspective view of still another electronic apparatus of the present invention.
Figure 13:
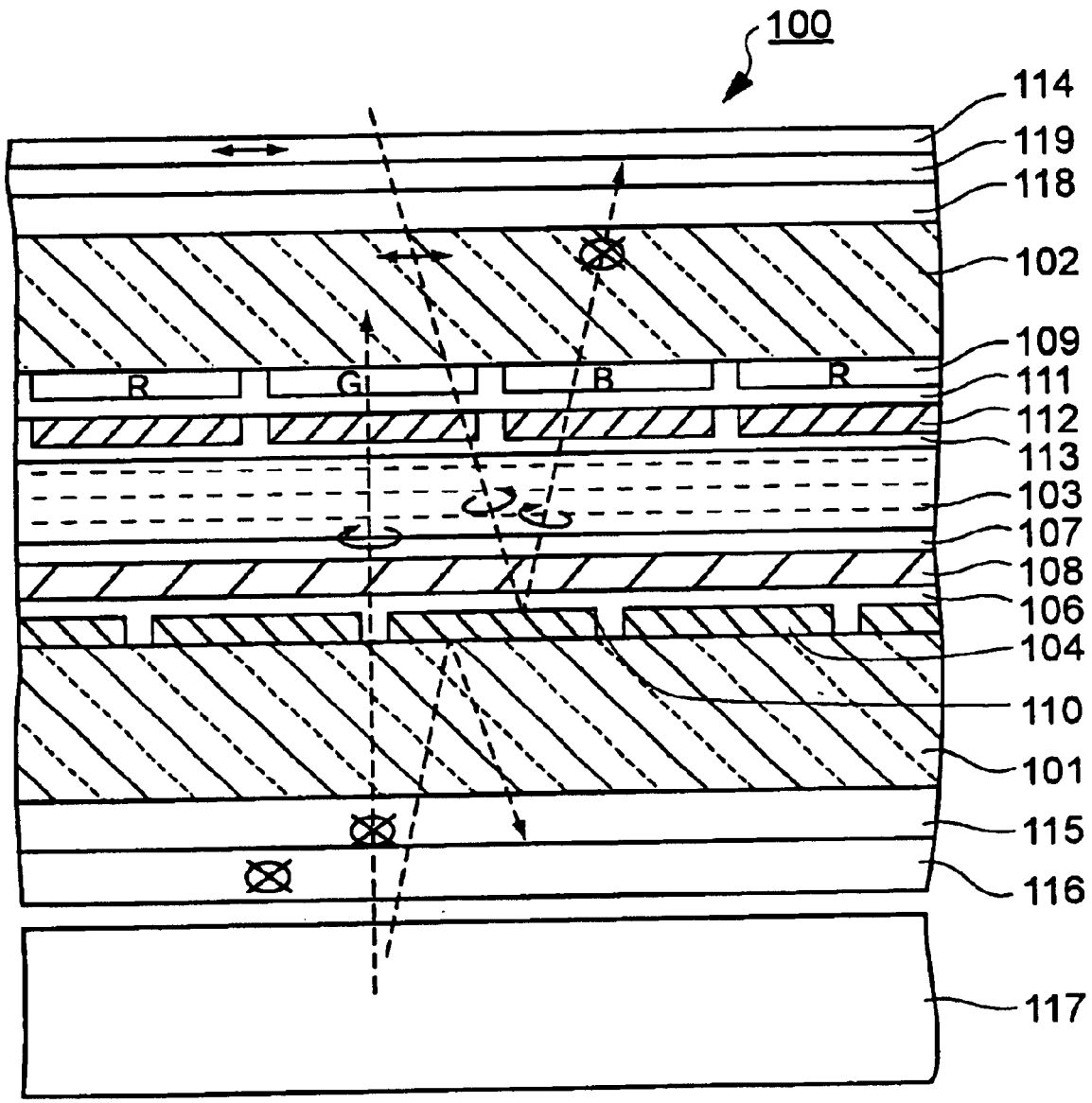
FIG. 13 is a sectional view of a related art liquid crystal display device.

FIG. 12 is a perspective view of an exemplary portable information processing apparatus, such as a word processor or a personal computer, for example. In FIG. 12, numeral 1200 designates an information processing apparatus, numeral 1202 designates an input portion such as a keyboard, numeral 1204 designates the main body of the information processing apparatus, and numeral 1206 designates a liquid crystal display using the liquid crystal display device described above.

Since these electronic apparatuses shown in FIGS. 10 to 12 each have a liquid crystal display using any one of the liquid crystal display devices according to the above-described embodiments, bright images can be displayed even in a transmissive mode. Hence, the electronic apparatuses each have a liquid crystal display ensuring excellent visibility in every place.

The technical scope of the present invention is not limited to the above-described embodiments, and various modifications may be made without departing from the scope and spirit of the invention. For example, although the quarter wave plate is used as a elliptically polarized light-transmitting device in the embodiments, any optical material may be used as long as it is capable of allowing elliptically polarized light to enter the liquid crystal layer.

In order to display images, it is ideal in the present invention that circularly polarized light enter the liquid crystal layer. However, incident light is not necessarily limited to perfect circularly polarized light, and if the decrease of light use efficiency is acceptable in some degree, elliptically polarized light may be used. In the embodiments, the color of light transmitted through the pigmented films of the pigmented color filter layer and the color of light reflected at the respective cholesteric liquid crystal films are the same, i.e., the transmission spectrum of the pigmented films of the pigmented color filter layer substantially overlaps with the reflection spectrum of the respective cholesteric liquid crystal films. However, if the decrease of light use efficiency is acceptable in some degree, these two spectrums may at least partly overlap.

[Advantages]

As described above, the liquid crystal display device of the present invention can reflect and transmit light in the same display mode. Particularly in a transmissive mode, most of the light transmitted through the transflective layer including cholesteric liquid crystal contributes to displaying images without the upper polarizer absorbing part of the light entering from the lower substrate side, as in a related art transflective liquid crystal display devices. Also, light reflected at the transflective layer including the cholesteric liquid crystal, and thus not entering the liquid crystal layer is reused to display images. Thus, a transflective liquid crystal display device can be achieved which increases the brightness of transmissive display images while maintaining the brightness of reflective display images and thus has excellent visibility.

What is claimed is:

1. A liquid crystal display device, comprising:
   a liquid crystal cell including an upper substrate on the viewing side, a lower substrate opposing the upper substrate, and a liquid crystal layer held between the upper substrate and the lower substrate;
   a color filter layer including a plurality of pigmented films containing different color pigments and a transflective layer including cholesteric liquid crystal films to reflect part of light elliptically polarized in a predetermined direction and to transmit part of the light elliptically polarized in the predetermined direction that are disposed on the inner surface of the lower substrate, in that order, such that the pigmented films are located between the lower substrate and the transflective layer;
   an upper elliptically polarized light transmitting device to allow the elliptically polarized light to enter the liquid crystal layer from above the upper substrate; and
   a lower elliptically polarized light transmitting device to allow the elliptically polarized light to enter the liquid crystal layer from below the lower substrate;
   the liquid crystal layer reversing the polarization of the elliptically polarized light either when a selection voltage is applied or when a non-selection voltage is applied, and not changing the polarization when the other voltage is applied; and
   at least part of the transmission spectrum of each pigmented film included in the color filter layer overlapping with the reflection spectrum of the corresponding cholesteric liquid crystal film.

2. The liquid crystal display device according to claim 1, further comprising an illumination device to emit light from below the lower substrate.

3. The liquid crystal display device according to claim 2, the upper elliptically polarized light transmitting device and the lower elliptically polarized light transmitting device each including a polarizer to transmit light linearly polarized in one direction and a retardation layer to change the linearly polarized light transmitted through the polarizer to elliptically polarized light.

4. The liquid crystal display device according to claim 3, the retardation layer being a quarter wave plate.

5. The liquid crystal display device according to claim 1, the cholesteric liquid crystal films each serving as a reflective color filter, in a predetermined region, to selectively reflect colored light having a wavelength corresponding to the pitch of helical liquid crystal molecules therein, and at least part of the reflection spectrum of each cholesteric liquid crystal film overlapping with the transmission spectrum of the corresponding pigmented film included in the color filter layer.

6. The liquid crystal display device according to claim 5, further comprising, at the predetermined regions between the lower substrate and the color filter layer, additional cholesteric liquid crystal films to reflect at least part of colored light having wavelengths outside of the reflection spectrum of the respective cholesteric liquid crystal films of the transflective layer.

7. The liquid crystal display device according to claim 5, the cholesteric liquid crystal films disposed between the lower substrate and the color filter layer, and the area of the cholesteric liquid crystal films being the same as or larger than the area of the pigmented films of the color filter layer, in plan view.

8. The liquid crystal display device according to claim 5, the reflection spectrum of the cholesteric liquid crystal films disposed between the lower substrate and the color filter layer being narrower than the spectrum complementary to the transmission spectrum of the respective pigmented films of the color filter layer.

9. The liquid crystal display device according to claim 5, further comprising, at the predetermined regions between the lower substrate and the color filter layer, additional cholesteric liquid crystal films to reflect at least part of light having a color complementary to the color of light transmitted through the respective pigmented films of the color filter layer.

10. The liquid crystal display device according to claim 5, the cholesteric liquid crystal films being disposed at the predetermined regions between the lower substrate and the color filter layer, and the pigmented films being covered with a transparent layer.

11. The liquid crystal display device according to claim 1, the cholesteric liquid crystal films reflecting and transmitting light having specific wavelengths.

12. The liquid crystal display device according to claim 1, the cholesteric liquid crystal films each serving as a reflective color filter, in a predetermined region, to selectively reflect colored light having a wavelength corresponding to the pitch of helical liquid crystal molecules therein, and the color of the light reflected at each cholesteric liquid crystal film and the color of light transmitted through the corresponding pigmented film of the color filter layer being the same.

13. The liquid crystal display device according to claim 1, the cholesteric liquid crystal films being disposed in the predetermined regions, and the pigmented films being covered with a light-transmitting layer.

14. An electronic apparatus, comprising:
the liquid crystal display device as set forth in claim 1.

15. A liquid crystal display device according to claim 1, wherein the upper elliptically polarized light transmitting device and the lower elliptically polarized light transmitting device allow light elliptically polarized in the same direction to enter the liquid crystal layer.

16. A liquid crystal display device, comprising:
a liquid crystal cell including an upper substrate, a lower substrate opposing the upper substrate, and a liquid crystal layer held between the upper substrate and the lower substrate;
a color filter layer including a plurality of pigmented films containing different color pigments and a transflective layer including cholesteric liquid crystal films to reflect part of light elliptically polarized in a predetermined direction and to transmit part of the light elliptically polarized in a predetermined direction that are disposed on the inner surface of the lower substrate, in that order;
an upper elliptically polarized light transmitting device to allow the elliptically polarized light to enter the liquid crystal layer from above the upper substrate; and
a lower elliptically polarized light transmitting device to allow the elliptically polarized light to enter the liquid crystal layer from below the lower substrate;
the liquid crystal layer reversing the polarization of the elliptically polarized light either when a selection voltage is applied or when a non-selection voltage is applied, and not changing the polarization when the other voltage is applied; and
at least part of the transmission spectrum of each pigmented film included in the color filter layer overlapping with the reflection spectrum of the corresponding cholesteric liquid crystal film, the cholesteric liquid crystal films being formed in the predetermined regions, and the area of the cholesteric liquid crystal films being smaller than the area of the pigmented films of the color filter layer, in plan view.

17. A liquid crystal display device, comprising:
a liquid crystal cell including an upper substrate, a lower substrate opposing the upper substrate, and a liquid crystal layer held between the upper substrate and the lower substrate;
a color filter layer including a plurality of pigmented films containing different color pigments and a transflective layer including cholesteric liquid crystal films to reflect part of light elliptically polarized in a predetermined direction and to transmit part of the light elliptically polarized in a predetermined direction, are disposed on the inner surface of the lower substrate, in that order;
an upper elliptically polarized light transmitting device to allow the elliptically polarized light to enter the liquid crystal layer from above the upper substrate; and
a lower elliptically polarized light transmitting device to allow the elliptically polarized light to enter the liquid crystal layer from below the lower substrate;
the liquid crystal layer reversing the polarization of the elliptically polarized light either when a selection voltage is applied or when a non-selection voltage is applied, and not changing the polarization when the other voltage is applied; and
at least part of the transmission spectrum of each pigmented film included in the color filter layer overlapping with the reflection spectrum of the corresponding cholesteric liquid crystal film, the reflection spectrum of each cholesteric liquid crystal film being narrower than the transmission spectrum of the corresponding pigmented film of the color filter layer.

18. A liquid crystal display device, comprising:
a liquid crystal cell including an upper substrate on the viewing side, a lower substrate opposing the upper substrate, and a liquid crystal layer held between the upper substrate and the lower substrate;
a color filter layer including a plurality of pigmented films containing different color pigments and a transflective layer including cholesteric liquid crystal films to reflect part of light elliptically polarized in a predetermined direction and to transmit part of the light elliptically polarized in the predetermined direction, the color filter layer and the transflective layer being disposed on the inner surface of the lower substrate, in that order, so that the color filter layer is interposed between the transflective layer and the lower substrate;
an upper elliptically polarized light transmitting device to allow the elliptically polarized light to enter the liquid crystal layer from above the upper substrate; and a lower elliptically polarized light transmitting device to allow the elliptically polarized light to enter the liquid crystal layer from below the lower substrate;

the liquid crystal layer reversing the polarization of the elliptically polarized light either when a selection voltage is applied or when a non-selection voltage is applied, and not changing the polarization when the other voltage is applied.

* * * * *